United States Patent

[11] 3,561,462

| [72] | Inventor | John Jugler |
| | | Danbury, Conn. |
| [21] | Appl. No. | 865,381 |
| [22] | Filed | Oct. 10, 1969 |
| [45] | Patented | Feb. 9, 1971 |
| [73] | Assignee | Branson Instruments, Incorporated |
| | | Stamford, Conn. |
| | | a corporation of Delaware |

[54] ULTRASONIC DRIVE ASSEMBLY FOR MACHINE TOOL
12 Claims, 4 Drawing Figs.

[52] U.S. Cl. ............................................. 173/57,
51/56, 51/59, 173/117, 173/139, 310/8.2
[51] Int. Cl. .................................................. E21b 27/00,
B24b 7/00
[50] Field of Search .................................. B24b/9/00;
173/57, 117; 310/8.2, 8.3; 52/59, 165; 175/57

[56] References Cited
UNITED STATES PATENTS

| 2,818,686 | 1/1958 | Weiss | 51/59 |
| 3,015,914 | 1/1962 | Roney | 51/56 |
| 3,211,243 | 10/1965 | Bodine, Jr. | 175/57 |
| 3,212,591 | 10/1965 | Tucker | 173/149 |
| 3,511,323 | 5/1970 | Riley, Jr. | 173/117 |

*Primary Examiner*—James A. Leppink
*Attorney*—Ervin B. Steinberg

ABSTRACT: An ultrasonic drive assembly comprises a shaft which while rotating is caused to be resonant along its axis at a sonic or ultrasonic frequency by piezoelectric means. A set of antifriction bearings is mounted on the shaft at nodal regions using liners for providing acoustic decoupling. The liners are made of compliant nonresilient material to minimize tool runout.

INVENTOR.
JOHN JUGLER

INVENTOR.
JOHN JUGLER
BY
Ervin B. Steinly

INVENTOR.
JOHN JUGLER
BY
Erwin B. Steinberg

ULTRASONIC DRIVE ASSEMBLY FOR MACHINE TOOL

This invention has reference to an ultrasonic tool and, more specifically, has reference to an ultrasonic machine tool for working on hard and brittle materials. Quite specifically, this invention concerns a drive assembly for a machine tool, the drive assembly being constructed to rotate about a central axis while simultaneously undergoing axial vibrations at a resonant sonic or ultrasonic frequency.

The use of machine tools which vibrate at a sonic or ultrasonic frequency while rotating about a central axis has been disclosed in several patents, see for instance U.S. Pat. No. 3,211,243 Albert G. Bodine, "Sonic Drilling by Rotating the Tool," dated Oct. 12, 1965; U.S. Pat. No. 3,015,914 Richard N. Roney, "Machine Tool," dated Jan. 9, 1962, or British Pat. No. 1,143,789 Percy Legge, filed 9 Mar. 1966, published 26 Feb. 1969.

These apparatus in conjunction with diamond chip or impregnated tools are eminently suited for machining hard and brittle materials such as glass, quartz, ceramic, silica or lightweight high-strength laminates as used in space technology, e.g. boron tungsten laminates.

However, the more widespread use of these machine tools has been hampered by various problems. One of the most important difficulties concerns the mounting of the drive assembly or spindle and its actuation. The spindle is required to rotate at several hundred or thousand revolutions per minute while undergoing longitudinal oscillation at frequencies in the sonic or ultrasonic range, typically 20 kHz. The interaction of these motions stresses the bearing surfaces and failure of the drive assembly may occur after a relatively short period of operation. Moreover, apparatus of this type are used for machining precision parts to relatively small and critical tolerances and a tool runout of but a few thousandths of an inch, in many instances, cannot be tolerated.

It has been rather difficult to design and construct a spindle which is adapted to operate at a high rotational speed, resonate at an ultrasonic frequency of at least 16 to 20 kHz., have substantially no runout at the tool end, yet provide trouble-free operation for at least several thousand hours of operation.

The present invention addresses itself to the problems enumerated above and life tests conducted on the assembly which will be described hereafter have evidenced the fact that a spindle meeting the stated criteria can be constructed.

One important aspect of the invention resides in the proper journaling of the drive shaft in antifriction bearings so that the shaft can be subjected to ultrasonic vibrations. The bearings are fitted over the shaft and means are provided for acoustically decoupling the bearings from the axial and radial oscillations. The use of bearings disposed directly on the drive shaft reduces the linear speed to which the bearings are subjected and, furthermore, substantially eliminates eccentricity of the shaft at the output end. Acoustic decoupling protects the bearings from axial and radial stress, thus providing relatively long and trouble-free operation. The acoustic decoupling means, as will be described in greater detail hereafter, also must be chosen most carefully. Specifically these means are constructed of such shape and material as not to contribute to or induce runout or eccentricity of the spindle, yet provide sufficient acoustic damping to protect the antifriction bearing, such as a ball or roller bearing, from harmful cyclic axial or radial motion.

One of the principal objects of this invention is, therefore, the provision of a new and improved drive assembly for an ultrasonic machine tool overcoming one or more of the shortcomings and disadvantages of the prior art devices.

Another important object of this invention is the provision of an improved drive spindle for an ultrasonic tool adapted to operate at high rotational speed and ultrasonic axial motion, and being characterized by improved performance and life.

A further important object of this invention is the provision of an improved drive assembly for an ultrasonic tool operating with negligible eccentricity, thereby permitting the machining of small and critical tolerances with utmost precision.

A still further and important object of this invention is the provision of a drive assembly for an ultrasonic machine tool incorporating a novel bearing mounting arrangement in order to provide greatly improved performance with regard to machining ability and life.

Further and still other objects of this invention will be more clearly apparent from the following description when taken in conjunction with the accompanying drawings, in which.

Figure 1:
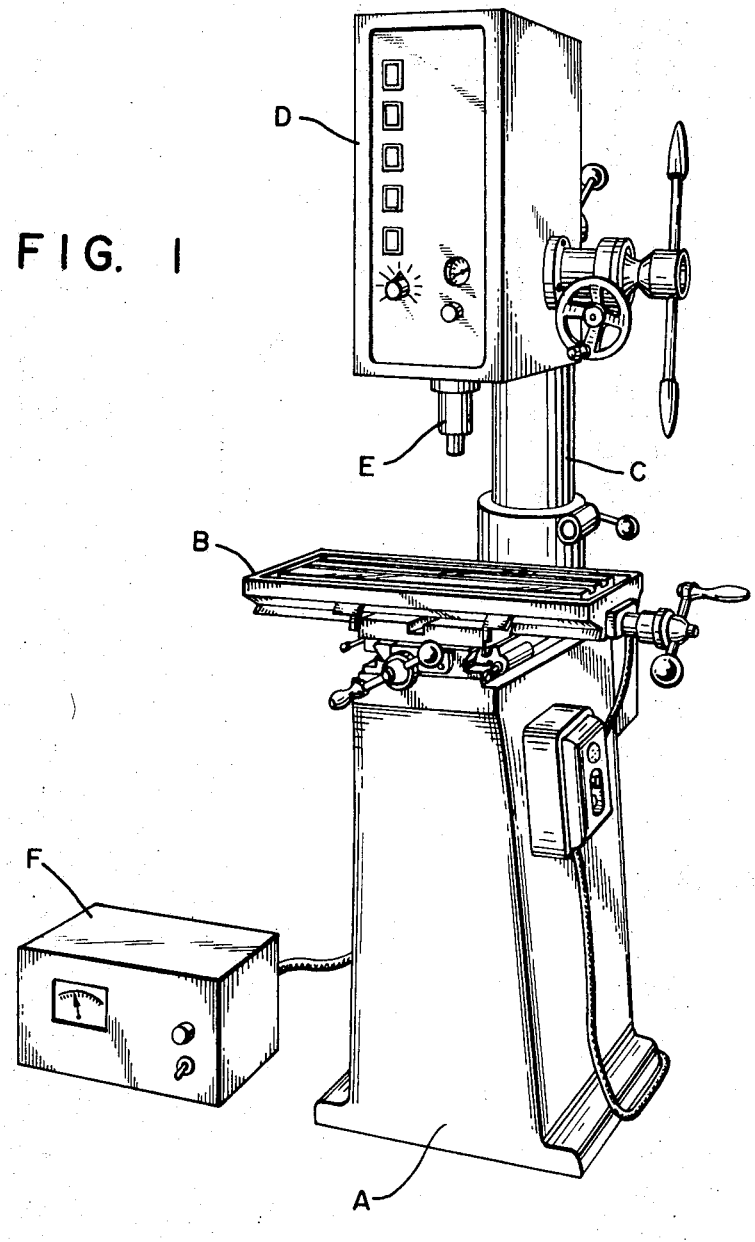
FIG. 1 is a perspective view of the apparatus incorporating the present invention.

Referring now to the FIGS. and FIG. 1 in particular, letter A identifies the base of the machine tool with which supports a worktable B, the latter being movable along two horizontal axes by the usual handcrank controls. Obviously, automatic feed means may be provided. A vertical column C extends from the base and supports a console D which encloses the ultrasonic drive assembly, the lower end E extending from the console housing. The console includes various controls, and the drive assembly is positionable relative to the worktable by the controls shown. Specifically, the tool-receiving end E of the drive assembly can be lowered and raised relative to the worktable. The console D also incorporates automatic feed means (not shown) to control the advance of the tool. An electrical high frequency generator F supplies the electric energy at sonic or ultrasonic frequency to the drive assembly.

Figure 2A:
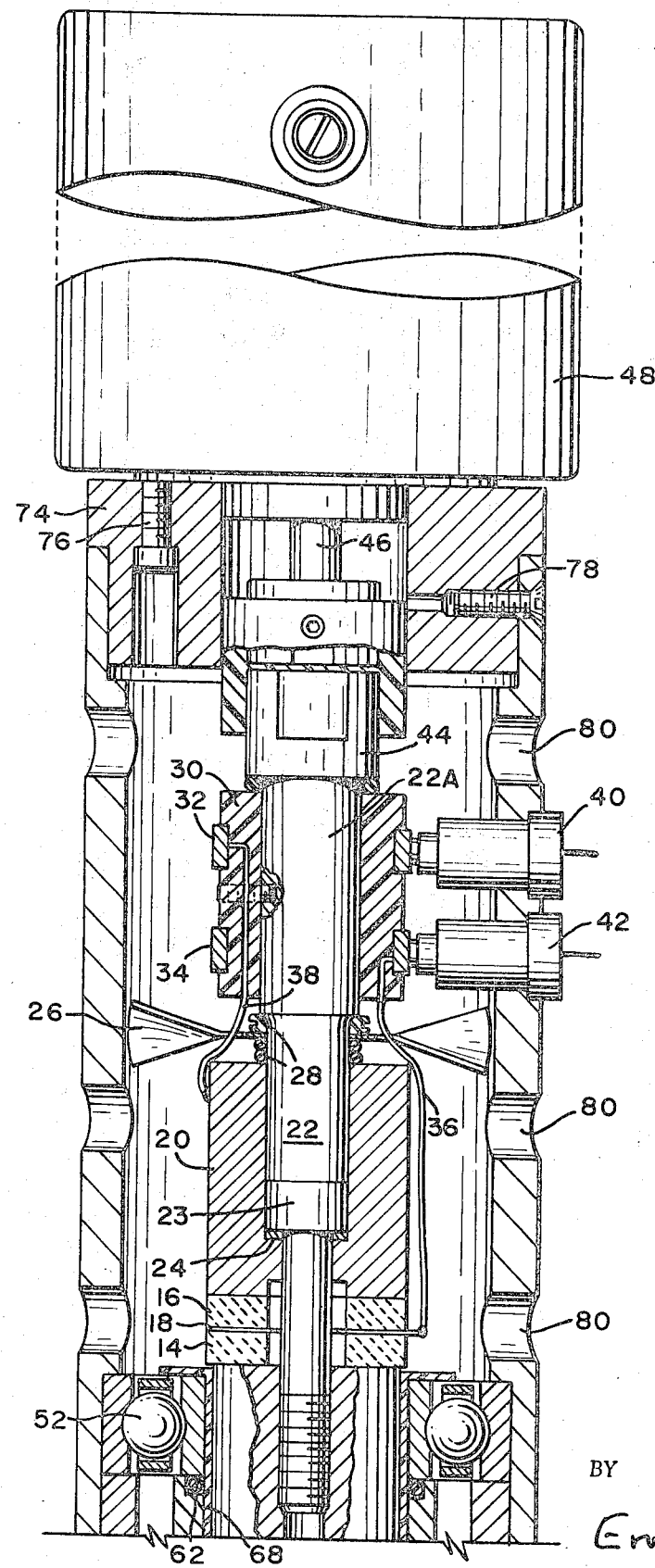
FIGS. 2A and 2B are elevational views, partly in section, of the drive assembly forming the invention.
Figure 2B:
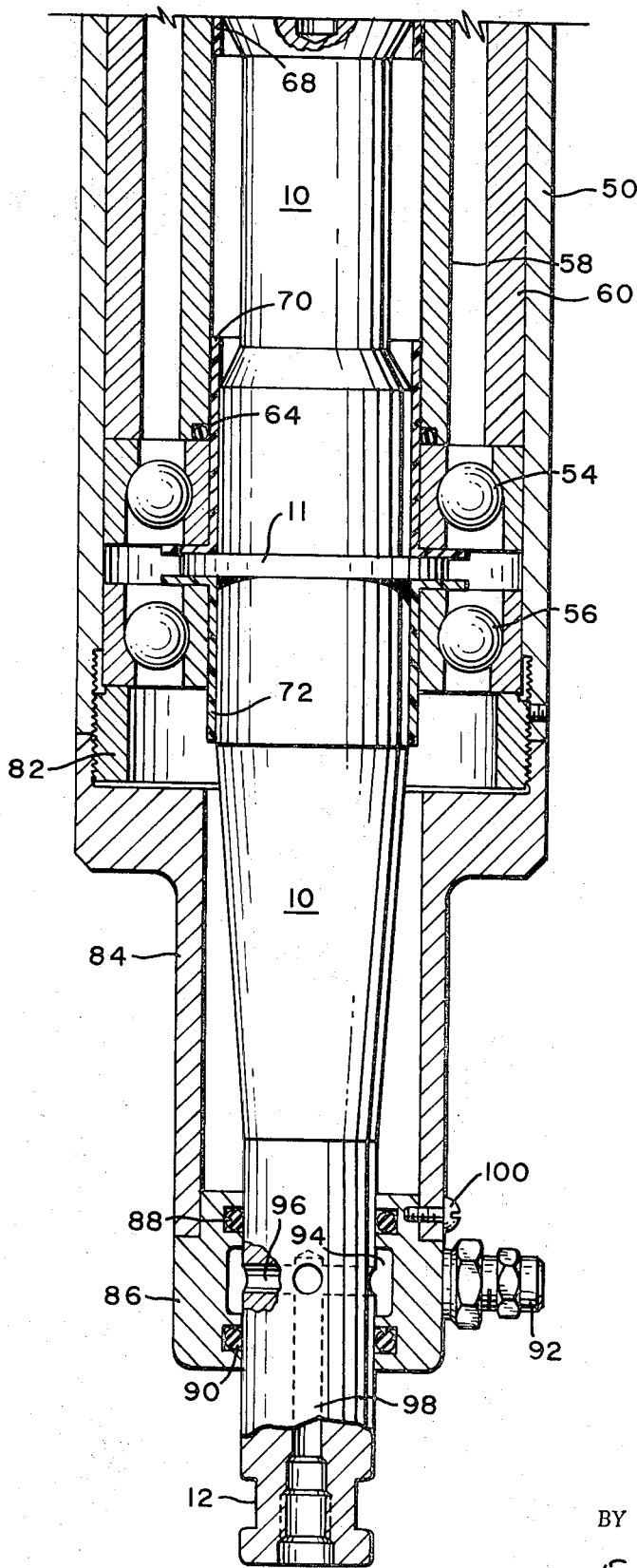
Figure 3:
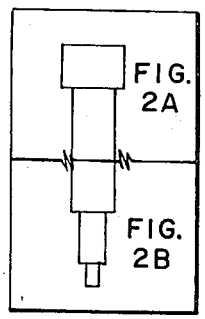
FIG. 3 is a schematic diagram showing the complementary arrangement of FIGS. 2A and 2B.

Referring now specifically to FIG. 2, the drive assembly comprises a structure adapted to be resonant along its longitudinal axis at a predetermined frequency, such as 18 or 20 kHz. The drive assembly includes a shaft 10 which at its lower end is provided with a coupling means 12 for receiving therein a tool adapted to operate upon a workpiece. The tool, in a typical example, comprises a diamond chip hollow core drill. At its upper end the shaft is fitted with a set of piezoelectric discs 14 and 16 having an electrode disc 18 therebetween. The discs are under compression and in intimate contact with the shaft by means of a back load 20 and a threaded bolt 22 whose headed portion 23 via a washer 24 applies pressure upon a recessed annular surface of the back load, thus causing responsive to the tightening of the bolt 22 the back load 20 and shaft 10 to be urged toward each other and the piezoelectric discs 14 and 16 to be under compression while the bolt is under tension. This arrangement of coupling the piezoelectric discs to a mass and providing a resonator is well known and understood as seen for instance in U.S. Pat. No. 3,328,610 issued to Stanley E. Jacke et al., entitled Sonic Wave Generator, issued Jun. 27, 1967.

The head of the bolt 22 is provided with an extension 22A for supporting a fan blade 26 which is held in place between a set of rubber grommets 28. The fan blade provides a flow of coolant air over the piezoelectric disc. Additionally the bolt extension supports a slip ring assembly 30 comprising two metallic slip rings 32 and 34 which are connected via respective electrical conductors 36 and 38 to the electrode 18 disposed between the piezoelectric discs and to the back load 20. The slip rings are fed with electrical energy via a set of contact brushes disposed in respective brushholders 40 and 42 from which electrical conductors extend. The upper end of the bolt is provided with a flexible coupling 44 which couples to the shaft 46 of an electric motor 48.

The shaft 10 is mounted for rotation within an outer stationary sleeve 50 by means of three antifriction bearings 52, 54 and 56. The lower bearings 54 and 56 straddle a flange 11 of the shaft 10 and this flange is located at a nodal region of the shaft when the latter is resonant along its longitudinal axis, thereby causing the bearings also to be disposed substantially in the nodal region. Likewise, the upper bearing 52 is located substantially in a nodal region of the shaft. The bearings are spaced from each other by means of an inner tubular spacer 58 and an outer tubular spacer 60. A set of O-rings 62 and 64 is interposed between the spacer 58 and the bearings 52 and 54. A most important feature of the present invention resides in the mode of acoustically decoupling the antifriction bearings 52, 54 and 56 which enable rotational motion of the resonating shaft 10. This is accomplished by means of L-shaped liners 68, 70 and 72 made of compliant material which retains the centering of the shaft within the bearings in order to prevent runout of the tool. Typically, the liner is made of thermoplastic material which is compliant but not resilient. An exemplary material satisfying this requirement is nylon. Each liner is interposed between the inner race of a bearing and the accurately machined bearing surface of the shaft. In this manner, the shaft is supported for rotation while undergoing oscillations along its longitudinal axis in response to the excitation of the piezoelectric discs. Whereas in the nodal region there is a minimum amount of axial motion, there is a pronounced motion in the radial direction which is substantially equal around the diameter of the shaft. The liners provide the acoustic decoupling required to achieve good life of the rolling members which in the absence of decoupling means would severely impact on the races. At the same time, the liners selected maintain the centering of the shaft.

The stationary sleeve 50 includes at its upper end a stepped bushing 74 which supports the stator of the electric motor 48, the latter being fastened to the bushing by a set of screws 76. The bushing is prevented from rotation by a screw 78.

The sleeve 50 includes also a set of vent holes 80 which permit entry and exit of cooling air in response to the rotation of the fan blade 26.

At the lower end of the sleeve 50 there is provided a threaded loading ring 82 which tightens the bearing 56 against the flange 11. A seal mount flange 84 is threaded upon the loading ring 82. A water jacket 86 which includes a pair of annular sealing rings 88 and 90 is fastened to the seal mount. Liquid coolant under pressure, such as water, is admitted to the jacket by means of a fitting 92 and is distributed within an annular chamber 94 from where the coolant is forced into the radially disposed ports 96 of the shaft and into the longitudinal bore 98 for discharge through the core of the drill coupled to the shaft. A screw 100 retains the water jacket in place. The annular chamber 94 is disposed substantially in a nodal region of the shaft in order to minimize the axial motion at the annular seals 88 and 90. The coolant admitted to the chamber 94 must be of sufficient pressure to be forced through the ports 96 and to overcome the centrifugal force existing when the shaft is in rotation. In order to minimize this problem the jacket is mounted to the small diameter end of the shaft at which the centrifugal force is less than at a larger diameter.

For operation the appropriate tool is inserted in the coupling means 12 and fastened with a threaded collar (not shown), and the motor 48 is energized. In a practical example, the motor 48 is a direct current motor rotating at 5,000 r.p.m. maximum speed. The motor speed is adjustable by a standard speed control device (not shown). The high frequency generator F is energized so as to apply via the brushholders 40 and 42 and the slip rings 32 and 34 an exciting potential across the piezoelectric discs which in the typical embodiment are made of lead zirconate titanate material and excited with a frequency of 20 kHz. This excitation causes the shaft 10 to be resonant along its longitudinal axis. In this manner, the tool is caused to undergo simultaneous rotation and axial vibration. The coolant flowing from the fitting 92 through the tool to the workpiece provides cooling and lubrication, and also flushes away from the working area dust and chipped particles. Moreover, the ultrasonic energy in conjunction with the liquid causes a steady cleaning effect which maintains the tool, such as a drill, free from debris and, hence, in an excellent working condition.

Extensive life tests have shown that the assembly disclosed heretofore meets the requirements stated above and that the drive assembly constitutes a major improvement over similar prior art devices.

I claim:

1. An ultrasonic drive assembly comprising:
a shaft adapted ro rotate and dimensioned to be resonant along its longitudinal axis at a predetermined frequency of oscillation;
electroacoustic means coupled to said shaft for causing said shaft to be resonant along its longitudinal axis;
a stationary sleeve surrounding at least a portion of said shaft;
a set of axially spaced antifriction bearings interposed between said sleeve and shaft for enabling said shaft to rotate within said sleeve, said bearings being disposed substantially in nodal regions of the shaft when the latter is resonant;
means disposed between said bearings and shaft for acoustically decoupling said bearings from said shaft; and
coupling means disposed on opposite ends of said shaft for receiving respectively means imparting rotation to said shaft and a tool adapted to operate on a workpiece.

2. An ultrasonic device assembly as set forth in claim 1, said means for acoustically decoupling comprising a liner of compliant material.

3. An ultrasonic drive assembly as set forth in claim 2, said liner of compliant material being interposed between said shaft and the inner race of a respective bearing.

4. An ultrasonic drive assembly as set forth in claim 3, said liner being made of compliant but substantially nonresilient material.

5. An ultrasonic drive assembly as set forth in claim 4, said shaft having a radial surface; said electroacoustic means being a set of piezoelectric discs coupled to said shaft surface; a rear mass and a bolt; said bolt sandwiching said discs between said shaft surface and said rear mass and providing a compressive force upon said discs; said bolt including an extension supporting thereupon a slip ring assembly providing electrical connection to said piezoelectric discs, and said extension including further said coupling means for said means imparying rotation to said shaft.

6. An ultrasonic derive assembly as set forth in claim 5, said extension including a cooling means for flowing air over the outside of said piezoelectric discs.

7. An ultrasonic drive assembly as set forth in claim 1, aid sleeve including means for supporting the stationary portion of said means imparting rotation.

8. An ultrasonic drive assembly as set forth in claim 1, said shaft end proximate to said coupling means adapted to receive a tool including an axially disposed bore and feed means communicating with said bore for supplying a coolant to said bore.

9. An ultrasonic drive assembly comprising:
a shaft adapted to rotate about its axis and being dimensioned to be resonant along its longitudinal axis at a predetermined frequency of oscillation;
piezoelectric disc means coupled to said shaft for causing said shaft to be resonant along its longitudinal axis;
means for energizing said disc means with electrical energy;
a flange forming a part of said shaft disposed substantially at a nodal region of said shaft when resonant;
a pair of antifriction bearings disposed about said shaft, one bearing at either side of said flange, for enabling said shaft to rotate, and each of said bearings having an inner race, an outer race, and rolling members therebetween;
a further antifriction bearing disposed about said shaft substantially at a further nodal region of said shaft;
acoustic decoupling means made of compliant material disposed between said shaft and the inner race of each responsive bearing;
a stationary sleeve disposed about the outer race of said respective bearings;
an extension coupled to said shaft and extending therefrom in an axial direction and being provided with a slip ring assembly and means for coupling a rotative drive means to said shaft;
an electrical brush assembly mounted to said stationary sleeve and cooperating with said slip ring assembly;

electrical conductor means connected to provide electrical connection between said slip ring assembly and said piezoelectric discs means;

coupling means for receiving a tool adapted to engage a workpiece disposed on said shaft at the end opposite said extension; and means for providing a liquid coolant to the tool coupled to said shaft in proximity to said coupling means for receiving a tool.

10. An ultrasonic drive assembly as set forth in claim 9, said shaft being dimensioned to be resonant at a frequency of at least 16 kHz.

11. An ultrasonic drive assembly as set forth in claim 9, said acoustic decoupling means being nonresilient material.

12. An ultrasonic drive assembly as set forth in claim 11, said acoustic decoupling means being thermoplastic material.